US011570080B1

(12) United States Patent
Pani et al.

(10) Patent No.: US 11,570,080 B1
(45) Date of Patent: Jan. 31, 2023

(54) MULTIPLE STATE CONTROL INTERFACES BETWEEN A CONTROL PLANE AND A USER PLANE IN A DISAGGREGATED BROADBAND NETWORK GATEWAY ARCHITECTURE

(71) Applicant: Juniper Networks, Inc., Sunnyvale, CA (US)

(72) Inventors: Subrat Pani, Acton, MA (US); John E. Ziegler, Westborough, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 17 days.

(21) Appl. No.: 17/444,719

(22) Filed: Aug. 9, 2021

(51) Int. Cl.
*H04L 43/10* (2022.01)
*H04L 41/0803* (2022.01)

(52) U.S. Cl.
CPC .......... *H04L 43/10* (2013.01); *H04L 41/0803* (2013.01)

(58) Field of Classification Search
CPC .............................. H04L 41/0803; H04L 43/10
See application file for complete search history.

(56) References Cited

U.S. PATENT DOCUMENTS

| | | | | |
|---|---|---|---|---|
| 10,965,615 | B2* | 3/2021 | Hahn | H04L 61/5014 |
| 11,324,077 | B2* | 5/2022 | Pani | H04W 76/12 |
| 2019/0052580 | A1* | 2/2019 | Peng | H04L 47/825 |
| 2022/0061129 | A1* | 2/2022 | Pani | H04W 76/12 |
| 2022/0132623 | A1* | 4/2022 | Xu | H04W 76/34 |

OTHER PUBLICATIONS

Chairman et al., "Proposed Allocation of Documents to Agenda Items for CT4#98E: Including Chairman's Notes," 3GPP, Jun. 20, 2020, vol. CT WG4, pp. 1-159, XP051903247, Retrieved from the Internet: [URL: https://ftp.3gpp.org/tsg_ct/WG4_protocollars_exCN4/TSGCT4_98e_meeting/Report/Draft_CT4_98e_meeting_report_v010.zip] [retrieved on Jun. 20, 2020].

ETSI., "Interface Between the Control Plane and the User Plane nodes," Nov. 1, 2020, pp. 1-317, XP055897678, Retrieved from the Internet: [URL: https://www.etsi.org/deliver/etsi_ts/129200_129299/129244/16.05.00_60/ts_129244v160500p.pdf] [retrieved on Mar. 4, 2022].

(Continued)

*Primary Examiner* — Jerry B Dennison
(74) *Attorney, Agent, or Firm* — Harrity & Harrity, LLP

(57) ABSTRACT

A disaggregated broadband network gateway (DBNG) control plane system may receive an association setup request message from a DBNG user plane device, wherein the association setup request message is received via a state control interface between the DBNG control plane system and the DBNG user plane device. The DBNG control plane system may determine, based on the association setup request message, one or more capabilities of the DBNG user plane device and may thereby cause one or more additional state control interfaces to be established between the DBNG control plane system and the DBNG user plane device. The DBNG control plane system and the DBNG control plane system may communicate messages associated with a first message type via the state control interface and may communicate messages associated with a second message type via at least one of the one or more additional state control interfaces.

20 Claims, 13 Drawing Sheets

(56) References Cited

OTHER PUBLICATIONS

Extended European Search Report for Application No. EP21199952, dated Mar. 14, 2022, 11 pages.
Haleplidis et al., "ForCES-based BNG; draft-haleplidis-forces-bng-00.txt," Internet Engineering Task Force, Nov. 4, 2019, pp. 1-58, XP015136149, Retrieved from the Internet: [URL: https://tools.ietf.org/html/draft-haleplidis-forces-bng-00] [retrieved on Nov. 4, 2019].
"Control and User Plane Separation for a disaggregated BNG", Technical Report, TR-459, Broadband Forum, Jun. 2020, pp. 1-102, Issue 1.
"3rd Generation Partnership Project; Technical Specification Group Core Network and Terminals; Interface between the Control Plane and the User Plane Nodes; Stage 3 (Release 16)"; Technical Specification; 3GPP TS 29.244; vol. 16.2.0; Dec. 2019; pp. 1-281; 3GPP Organizational Partners.

* cited by examiner

| Message Type value (Decimal) | Message |
|---|---|
| 0 | Reserved |
| 1 | PFCP Heartbeat Request |
| 2 | PFCP Heartbeat Response |
| 3 | PFCP PFD Management Request |
| 4 | PFCP PFD Management Response |
| 5 | PFCP Association Setup Request |
| 6 | PFCP Association Setup Response |
| 7 | PFCP Association Update Request |
| 8 | PFCP Association Update Response |
| 9 | PFCP Association Release Request |
| 10 | PFCP Association Release Response |
| 11 | PFCP Version Not Supported Response |
| 12 | PFCP Node Report Request |
| 13 | PFCP Node Report Response |
| 14 | PFCP Session Set Deletion Request |
| 15 | PFCP Session Set Deletion Response |
| 16 to 49 | For future use |
| 50 | PFCP Session Establishment Request |
| 51 | PFCP Session Establishment Response |
| 52 | PFCP Session Modification Request |
| 53 | PFCP Session Modification Response |
| 54 | PFCP Session Deletion Request |
| 55 | PFCP Session Deletion Response |
| 56 | PFCP Session Report Request |
| 57 | PFCP Session Report Response |
| 58 to 99 | For future use |
| 100 to 255 | For future use |

Heartbeat Messages: 1–2
Node-related Messages: 3–15
Session-related Messages: 50–55
Reporting-related Messages: 56–57

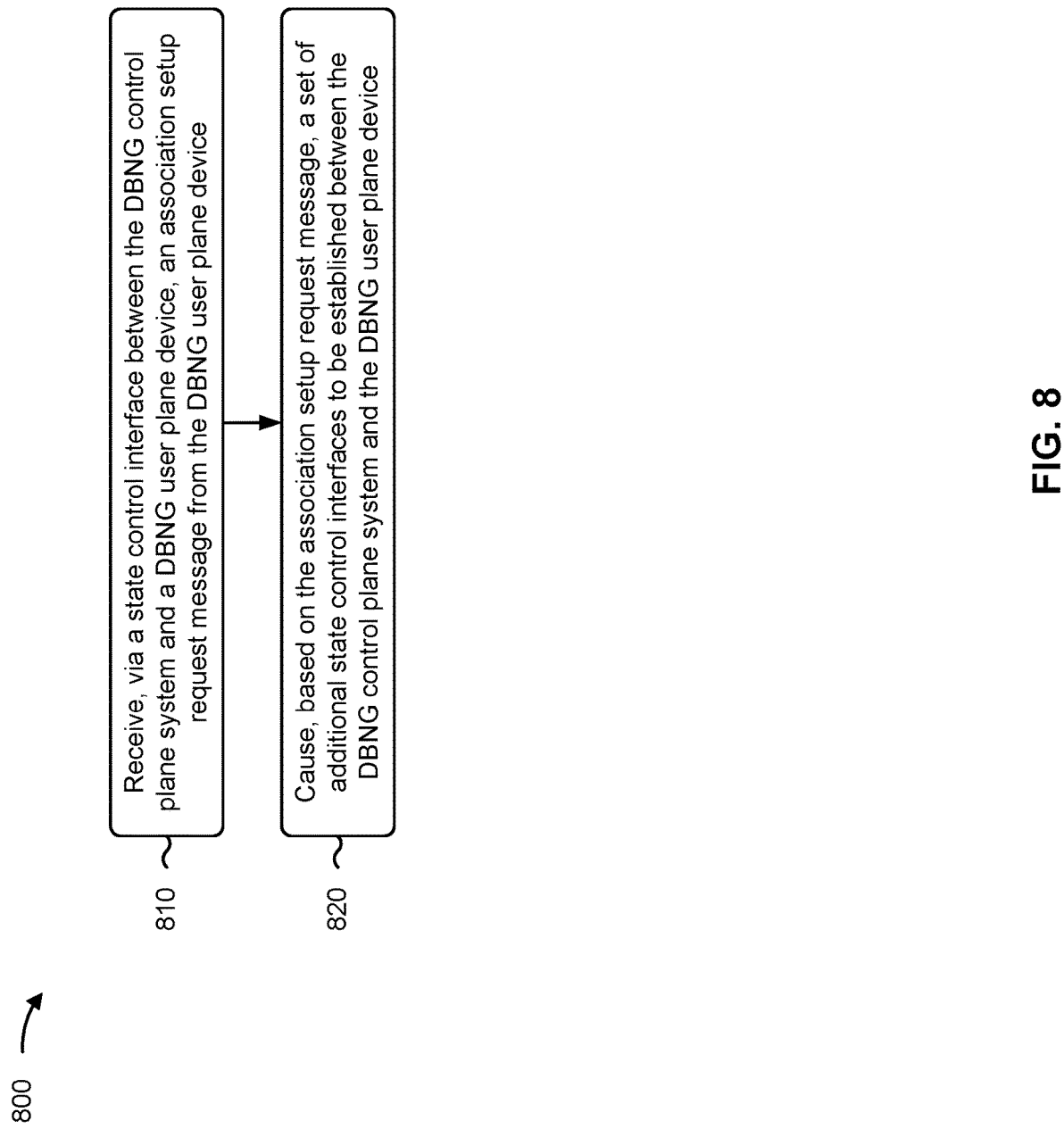

MULTIPLE STATE CONTROL INTERFACES BETWEEN A CONTROL PLANE AND A USER PLANE IN A DISAGGREGATED BROADBAND NETWORK GATEWAY ARCHITECTURE

BACKGROUND

A broadband network gateway (BNG) routes traffic to and from broadband remote access devices, such as digital subscriber line access multiplexers (DSLAMs), on an Internet service provider (ISP) network. The BNG enables subscribers to connect to the broadband network, and performs authentication, authorization, and accounting; assigns Internet protocol (IP) addresses; and enforces quality of service (QoS) policies, among other examples.

SUMMARY

Some implementations described herein relate to a method. The method may include receiving, by a disaggregated broadband network gateway (DBNG) control plane system, an association setup request message from a DBNG user plane device, where the association setup request message is received via a state control interface between the DBNG control plane system and the DBNG user plane device. The method may include determining, by the DBNG control plane system and based on the association setup request message, one or more capabilities of the DBNG user plane device. The method may include causing, by the DBNG control plane system and based on determining the one or more capabilities of the DBNG user plane device, one or more additional state control interfaces to be established between the DBNG control plane system and the DBNG user plane device.

Some implementations described herein relate to a DBNG user plane device. The DBNG user plane device may include one or more memories and one or more processors. The one or more processors may be configured to send an association setup request message to a DBNG control plane system. The one or more processors may be configured to receive, after sending the association setup request message, an association setup response message from the DBNG control plane system. The one or more processors may be configured to communicate, based on receiving the association setup response message, with the DBNG control plane system via the state control interface and one or more additional state control interfaces between the DBNG control plane system and the DBNG user plane device.

Some implementations described herein relate to a non-transitory computer-readable medium that stores a set of instructions for a DBNG control plane system. The set of instructions, when executed by one or more processors of the DBNG, may cause the DBNG to receive, via a state control interface between the DBNG control plane system and a DBNG user plane device, an association setup request message from the DBNG user plane device. The set of instructions, when executed by one or more processors of the DBNG, may cause the DBNG to cause, based on the association setup request message, a set of additional state control interfaces to be established between the DBNG control plane system and the DBNG user plane device.

BRIEF DESCRIPTION OF THE DRAWINGS

FIG. 2 is an illustration of types of messages that may be communicated by a DBNG control plane system and a DBNG user plane device described herein.

FIGS. 6-8 are flowcharts of example processes relating to establishing multiple state control interfaces between a DBNG control plane system and DBNG user plane device.

DETAILED DESCRIPTION

Figure 1A:
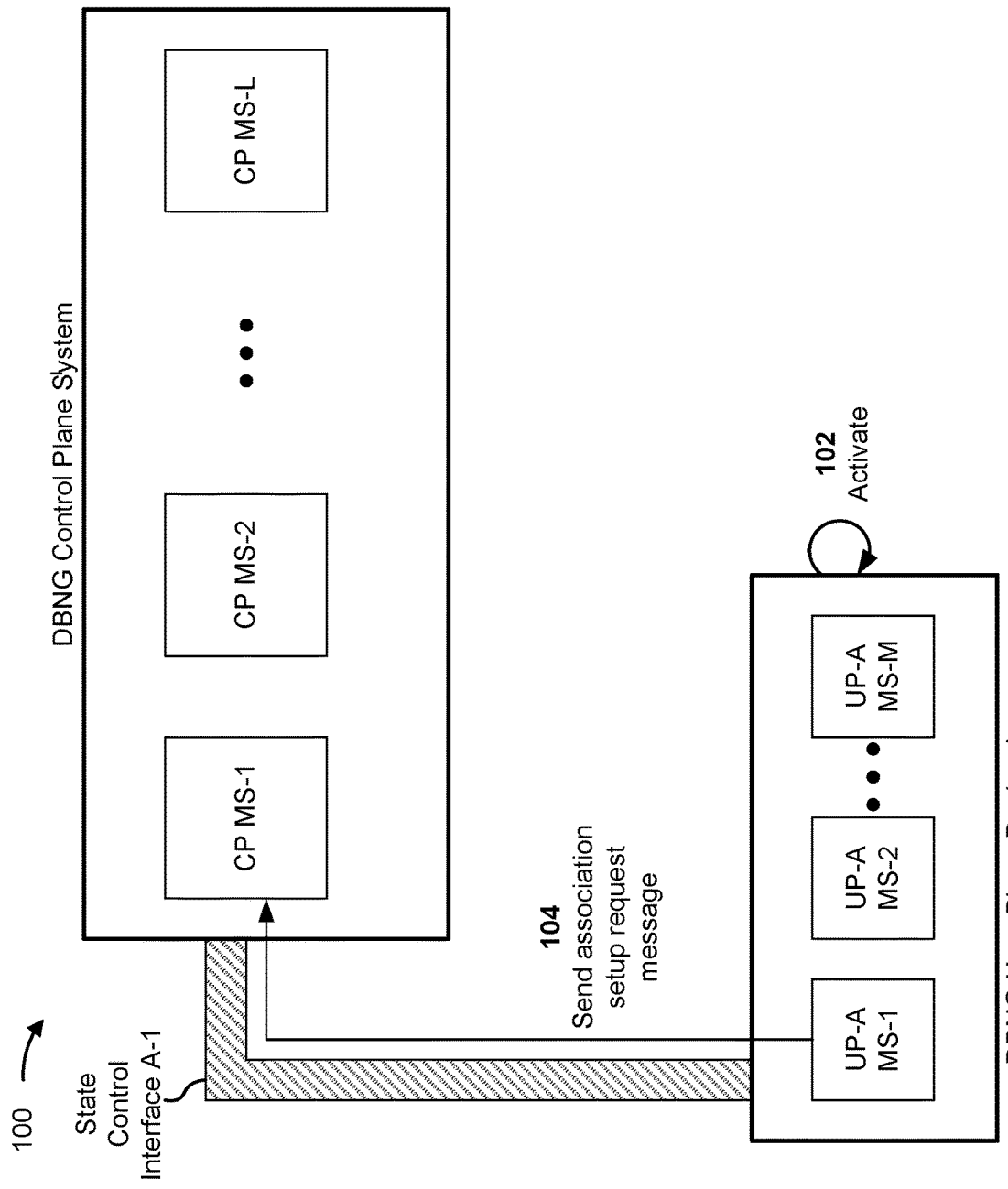
FIGS. 1A-1F are diagrams of an example implementation described herein.

The following detailed description of example implementations refers to the accompanying drawings. The same reference numbers in different drawings may identify the same or similar elements.

To accommodate growth in a quantity of subscribers, a quantity and types of services being provided by BNGs, and an amount of traffic being processed by BNGs, a disaggregated BNG (DBNG) may be deployed by a service provider. The DBNG physically and logically separates a control plane and a user plane (also termed a "data plane"). For example, software to perform control plane functions may be distributed for execution by servers as virtualized BNG functions. Devices to implement the user plane, which may include physical network devices or virtual user plane devices, remain in a forwarding path between access networks and a data network to process packet flows according to subscriber forwarding state rules programmed by the control plane.

In many cases, a single interface is provided between the control plane and the user plane to communicate DBNG state-related information between the control plane and the user plane. However, in some cases, the control plane and the user plane need to share large amounts of information within a particular period of time. This can create a bottleneck, which causes high-priority information (e.g., information that needs to be timely exchanged to meet service level agreement (SLA) requirements and/or protocol timeout requirements) to be delayed, lost, dropped, and/or otherwise not communicated. Accordingly, this negatively impacts a performance of the control plane, the user plane, and the DBNG.

Some implementations described herein provide a DBNG that includes a DBNG control plane system and one or more DBNG user plane devices. The DBNG control plane system and a DBNG user plane device, of the one or more DBNG user plane devices, may communicate with each other to cause multiple state control interfaces to be established between the DBNG control plane system and the DBNG user plane device. Accordingly, the DBNG control plane system and the DBNG user plane device may communicate DBNG state-related messages to each other via the multiple state control interfaces. In some implementations, each state control interface, of the multiple state control interfaces, is configured to transmit messages associated with a particular message type between the DBNG control plane system and the DBNG user plane device. For example, a first set of state control interfaces (e.g., that comprises one or more state control interfaces) may transmit node-related messages, a second set of state control interfaces may transmit session-related messages, and a third set of state control interfaces may transmit reporting-related messages.

In this way, some implementations described herein enable messages with a same or similar priority (e.g., where the priority is based on the type of message) to be sent via a particular set of state control interfaces between the DBNG control plane system and the DBNG user plane device. This reduces a likelihood that high-priority messages are delayed or otherwise not transmitted due to a bottleneck issue associated with a single interface. This increases a likelihood that state-related information is timely communicated between the DBNG user plane device and the DBNG control plane system. Therefore, using multiple state control interfaces (e.g., that depend on message type) between the DBNG control plane system and the DBNG user plane device improves a performance of the DBNG user plane device, the DBNG control plane system, and the DBNG, as compared to using a single interface between the DBNG user plane device and the DBNG control plane system.

FIGS. 1A-1F are diagrams of one or more example implementations 100 described herein relating to a DBNG. Example implementation(s) 100 may include a DBNG control plane system and multiple DBNG user plane devices (shown as DBNG user plane device A and DBNG user plane device B), which are described in more detail below in connection with FIGS. 3-5. In some implementations, each of the DBNG control plane system and multiple DBNG user plane devices may include one or more microservices. For example, as shown in FIGS. 1A-1F, the DBNG control plane system may include one or more control plane microservices (shown as microservices CP MS-1 through CP MS-L, where L≥1), the DBNG user plane device A may include one or more user plane microservices (shown as microservices UP-A MS-1 through UP-A MS-M, where M≥1), and the DBNG user plane device B may include one or more user plane microservices (shown as microservices UP-B MS-1 through UP-B MS-N, where N≥1).

As shown in FIG. 1A, and by reference number 102, the DBNG user plane device A may be activated. For example, the DBNG user plane device A may be turned on, come online, or otherwise become available to provide control plane services for the DBNG. In some implementations, when the DBNG user plane device A is activated, a state control interface may be established between the DBNG user plane device A and the DBNG control plane system. For example, the DBNG user plane device A may send identification information (e.g., via another interface, such as a management interface) to the DBNG control plane system, which may authenticate and/or verify the DBNG user plane device A. Accordingly, the DBNG control plane system and the DBNG user plane device A may communicate (e.g., send, via the other interface, information identifying available port numbers of the DBNG control plane system and the DBNG user plane device A) to establish the state control interface. For example, as shown in FIG. 1A, the DBNG user plane device A and the DBNG control plane system may communicate to establish the state control interface A-1.

As shown by reference number 104, the DBNG user plane device A may send a node-related message, such as an association setup request message to the DBNG control plane system (e.g., via the state control interface). In some implementations, the association setup request message may be a packet forwarding control protocol (PFCP) message (e.g., a PFCP association setup request message). The association setup request message may include information indicating one or more capabilities of the DBNG user plane device A, such as one or more of a buffering capability, a traffic steering capability, or a message bundling capability, among other examples. In a specific example, the association setup request message may indicate a quantity of state control interfaces that the DBNG user plane device A can support (e.g., a total quantity of state control interfaces that the DBNG user plane device A can support, or a quantity of additional state control interfaces that the DBNG user plane device A can support).

In some implementations, a microservice of the DBNG user plane device A may send (e.g., via the state control interface) the association setup request message to a microservice of the DBNG control plane system. For example, as further shown in FIG. 1A, the UP-A MS-1 microservice of the DBNG user plane device A may send the association setup request message to the CP MS-1 microservice of the DBNG control plane system (e.g., via the state control interface A-1). The UP-A MS-1 microservice may be associated with management and control functions of the DBNG user plane device A and/or the CP MS-1 may be associated with management and control functions of the DBNG control plane system.

Figure 1B:
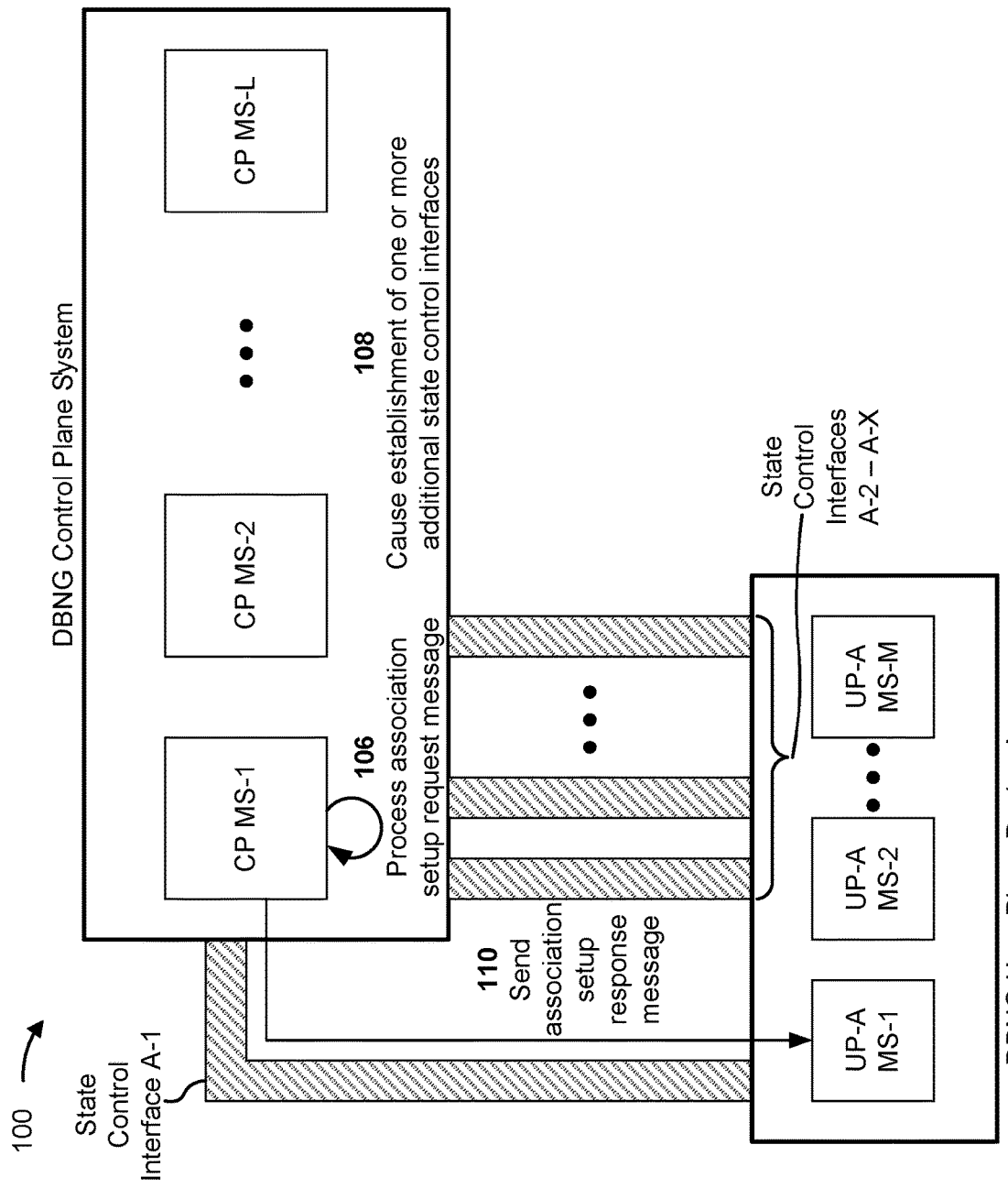

As shown in FIG. 1B, and by reference number 106, the DBNG control plane system may process the association setup request message (e.g., after receiving the association setup request message). For example, the DBNG control plane system may process (e.g., parse) the association setup request message to determine the one or more capabilities of the DBNG user plane device A, such as the quantity of state control interfaces that the DBNG user plane device A can support. In some implementations, a microservice of the DBNG control plane system, such as the CP MS-1 microservice that received the association setup request message, may process the association setup request message to determine the one or more capabilities of the DBNG user plane device A.

As shown by reference number 108, the DBNG control plane system may cause one or more additional state control interfaces to be established between the DBNG control plane system and the DBNG user plane device A. For example, as further shown in FIG. 1B, the DBNG control plane system may cause one or more additional state control interfaces A-2 through A-X, where X≥2, to be established between the DBNG control plane system and the DBNG user plane device A. In some implementations, the DBNG control plane system may cause the one or more additional state control interfaces to be established based on determining the one or more capabilities of the DBNG user plane device A. For example, the DBNG control plane system may cause, based on the quantity of state control interfaces that the DBNG user plane device A can support, one or more ports of the DBNG control plane system to be respectively allocated for the one or more additional state control interfaces. As shown by reference number 110, the DBNG control plane system may send (e.g., via the state control interface) an association setup response message that includes identification information associated with the one or more ports (e.g., that indicates the port numbers of the one or more ports) to the DBNG user plane device A. The DBNG user plane device A may process (e.g., parse) the association setup response message to determine the identification information and may cause, based on the identification information, one or more ports of the DBNG user plane device A to be respectively allocated for the one or more additional state control interfaces (e.g., such that an additional state control interface is established between particular ports of the DBNG control plane system and the DBNG user plane device A).

In some implementations, a microservice of the DBNG control plane system, such as the CP MS-1 microservice, may cause establishment of the one or more additional state control interfaces (e.g., as described herein in relation to reference numbers 108 and 110). Additionally, or alternatively, a microservice of the DBNG user plane device A, such as the UP-A MS-1 microservice, may facilitate establishment of the one or more additional state control interfaces (e.g., as described herein in relation to reference number 110).

Figure 1C:
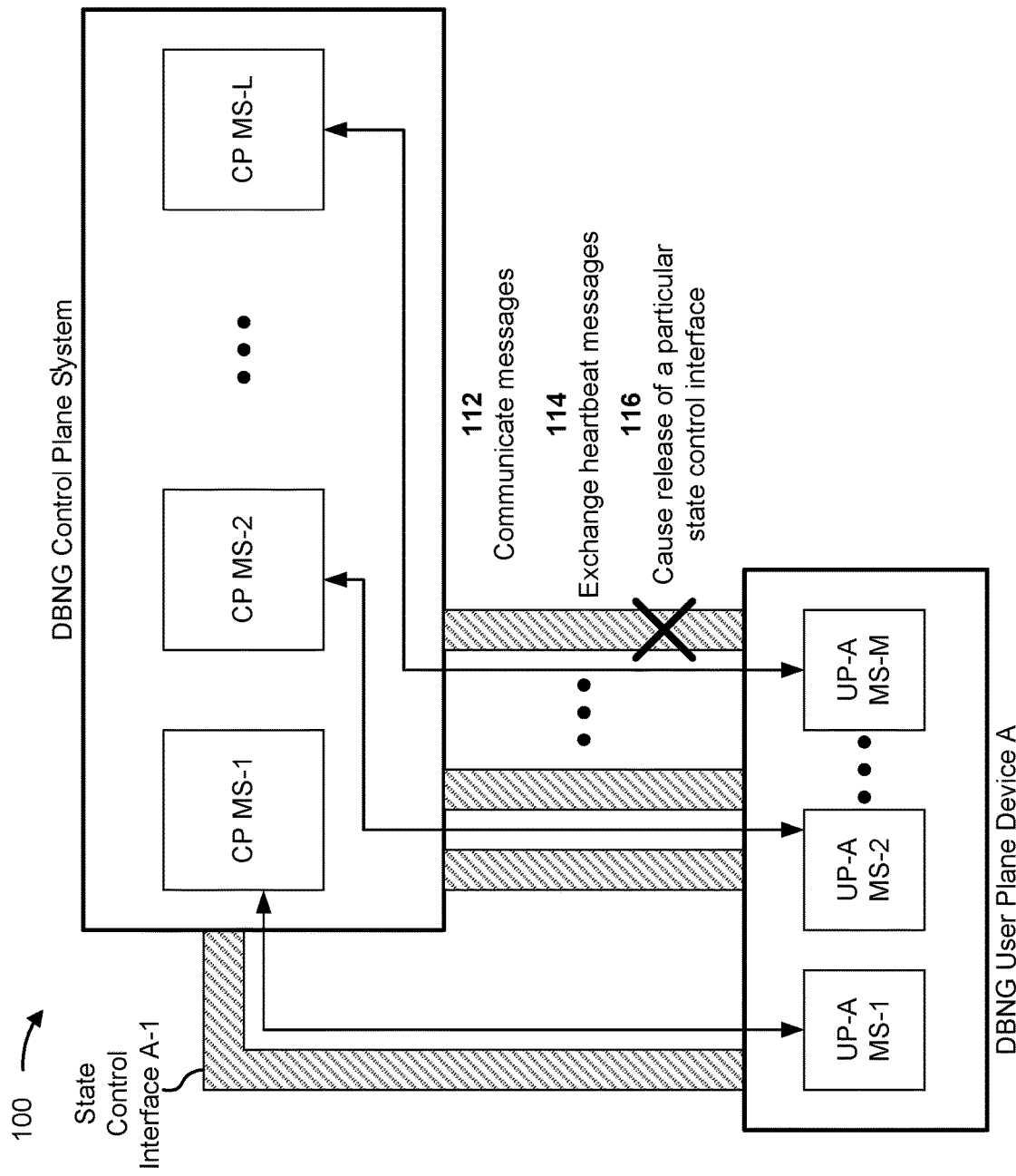

As shown in FIG. 1C, and by reference number 112, the DBNG control plane system and/or the DBNG user plane device A may communicate messages. For example, the DBNG control plane system may send messages to and/or receive messages from the DBNG user plane device A. In some implementations, the DBNG control plane system and/or the DBNG user plane device A may communicate messages via the state control interface and the one or more additional state control interfaces. For example, the DBNG control plane system and/or the DBNG user plane device A may communicate messages via the state control interface A-1 and the additional state control interfaces A-2 through A-X.

In some implementations, each state control interface, of the state control interface and the one or more additional state control interfaces, may transmit messages associated with a particular type of message. For example, the DBNG control plane system and/or the DBNG user plane device A may communicate a first set of messages associated with a first message type via the state control interface, may communicate a second set of messages associated with a second message type via a first set of additional state control interfaces of the one or more additional state control interfaces (e.g., a first set that comprises at least one of the one or more additional state control interfaces), and/or may communicate a third set of messages associated with a third message type via a second set of additional state control interfaces of the one or more additional state control interfaces (e.g., a second set that comprises at least one of the one or more additional state control interfaces). In a specific example, the DBNG control plane system and/or the DBNG user plane device A may communicate node-related messages (e.g., PFCP messages with message type values of 3-15, as described herein in relation to FIG. 2) via the state control interface, session-related messages (e.g., PFCP messages with message type values of 50-55, as described herein in relation to FIG. 2) via the first set of additional state control interfaces, and reporting-related messages (e.g., PFCP messages with message type values of 56-57, as described herein in relation to FIG. 2) via the second set of additional control interfaces.

In some implementations, each state control interface, of the state control interface and the one or more additional state control interfaces, may be associated with a microservice of the DBNG control plane system and/or may be associated with a microservice of the DBNG user plane device A. For example, as shown in FIG. 1C, the state control interface A-1 may be associated with the CP MS-1 microservice of the DBNG control plane system and/or the UP-A MS-1 microservice of the DBNG user plane device A. That is, the CP MS-1 microservice of the DBNG control plane system and/or the UP-A MS-1 microservice of the DBNG user plane device A may communicate messages (e.g., messages of a first message type, such as node-related messages) via the state control interface A-1.

As another example, as shown in FIG. 1C, a first set of additional state control interfaces of the one or more additional state control interfaces (e.g., a first set that comprises at least one of the one or more additional state control interfaces) may be associated with the CP MS-2 microservice of the DBNG control plane system and/or the UP-A MS-2 microservice of the DBNG user plane device A, and/or a second set of additional state control interfaces of the one or more additional state control interfaces (e.g., a second set that comprises at least one of the one or more additional state control interfaces) may be associated with the CP MS-L microservice of the DBNG control plane system and/or the UP-A MS-M microservice of the DBNG user plane device A. That is, the CP MS-2 microservice of the DBNG control plane system and/or the UP-A MS-2 microservice of the DBNG user plane device A may communicate messages (e.g., messages of a second message type, such as session-related messages) via the first set of additional state control interfaces and/or the CP MS-L microservice of the DBNG control plane system, and/or the UP-A MS-M microservice of the DBNG user plane device A may communicate messages (e.g., messages of a third message type, such as reporting-related messages) via the second set of additional state control interfaces.

As further shown in FIG. 1C, and by reference number 114, the DBNG control plane system and the DBNG user plane device A may exchange heartbeat messages (e.g., PFCP heartbeat messages with message type values of 1-2, as described herein in relation to FIG. 2) via the state control interface and the one or more additional state control interfaces. For example, the DBNG control plane system and/or the DBNG user plane device A may send heartbeat messages to and/or receive heartbeat messages from each other via the state control interface and the one or more additional state control interfaces (e.g., send and/or receive respective heartbeat messages via the state control interface and the one or more additional state control interfaces).

In this way, the DBNG control plane system and/or the DBNG user plane device A may determine (e.g., based on a frequency of the exchange of heartbeat messages) whether a particular state control interface, of the state control interface and the one or more additional state control interfaces, is active or inactive (e.g., whether the particular state control interface is up or down). For example, the DBNG control plane system may determine that a heartbeat timeout interval has expired without the DBNG control plane system receiving at least one heartbeat message from the DBNG user plane device A via the particular state control interface (e.g., a time between receiving heartbeat messages from the DBNG user plane device A via the particular state control interface has exceeded the timeout interval). This may indicate that the particular state control interface is inactive. Accordingly, as shown by reference number 116, the DBNG control plane system may cause the particular state control interface to be released (e.g., cause the particular state control interface to be torn down). In this way, resources associated with maintaining the particular state control interface by the DBNG control plane system and/or the DBNG user plane device A may be reallocated to improve a performance of the DBNG control plane system and/or the DBNG user plane device A.

Figure 1D:
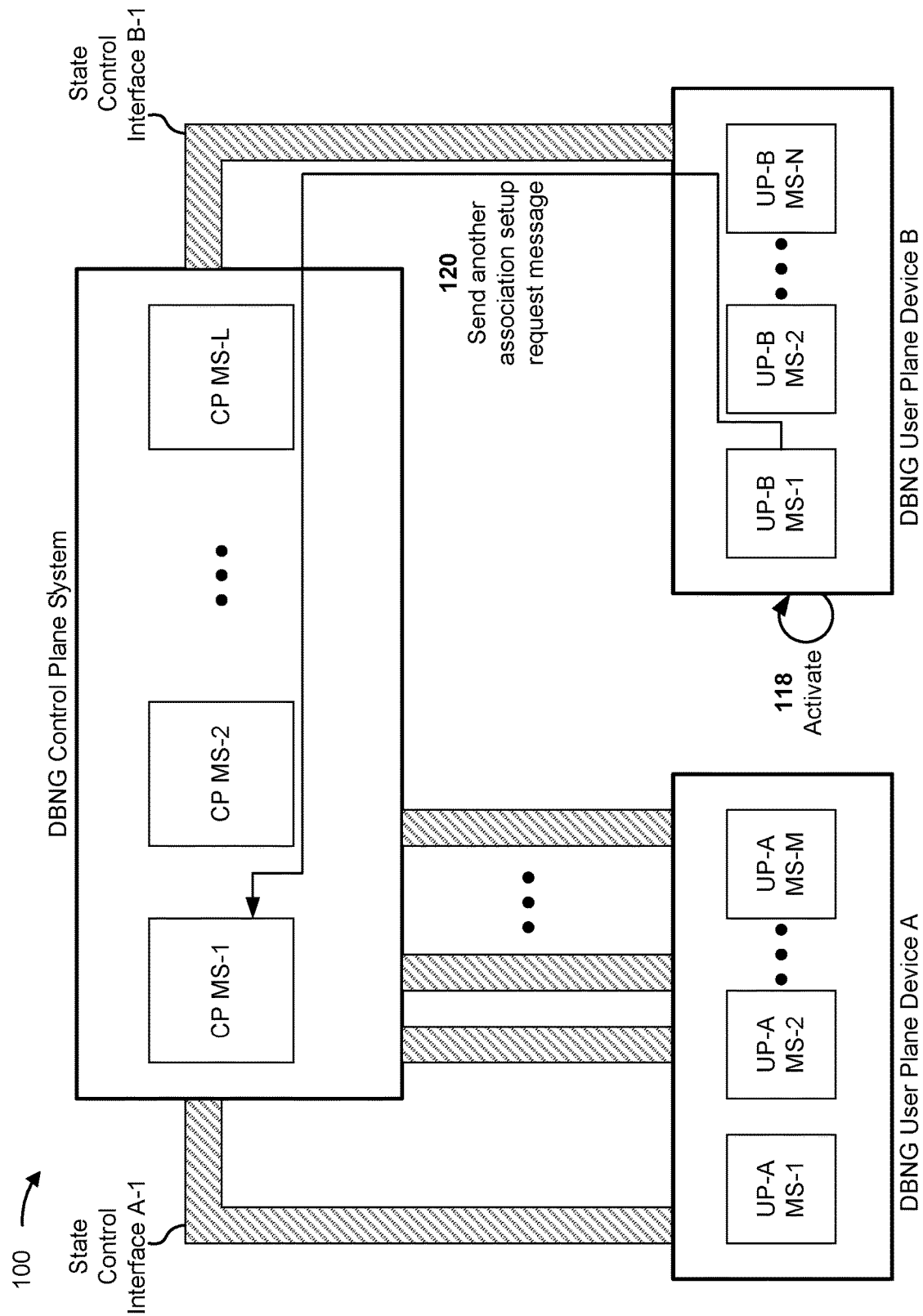

As shown in FIG. 1D, and by reference number 118, the DBNG user plane device B may be activated. For example, the DBNG user plane device B may be turned on, come online, or otherwise become available to provide control plane services for the DBNG. In some implementations, when the DBNG user plane device B is activated, another state control interface may be established between the DBNG user plane device B and the DBNG control plane system (e.g., in a similar manner as that described herein in relation to FIG. 1A and reference number 102). For example, as shown in FIG. 1D, the DBNG user plane device B and the DBNG control plane system may communicate to establish the state control interface B-1.

As shown by reference number 120, the DBNG user plane device B may send a node-related message, such as another association setup request message to the DBNG control plane system (e.g., via the other state control interface). In some implementations, the other association setup request message may be a PFCP message (e.g., a PFCP association setup request message) and may include information indicating one or more capabilities of the DBNG user plane device B. For example, the other association setup request message may indicate a quantity of state control interfaces that the DBNG user plane device B can support (e.g., a total quantity of state control interfaces that the DBNG user plane device B can support, or a quantity of additional state control interfaces that the DBNG user plane device B can support).

In some implementations, a microservice of the DBNG user plane device B may send (e.g., via the other state control interface) the other association setup request message to a microservice of the DBNG control plane system. For example, as further shown in FIG. 1D, the UP-B MS-1 microservice of the DBNG user plane device B may send the other association setup request message to the CP MS-1 microservice of the DBNG control plane system (e.g., via the other state control interface B-1). The UP-B MS-1 microservice may be associated with management and control functions of the DBNG user plane device B.

Figure 1E:
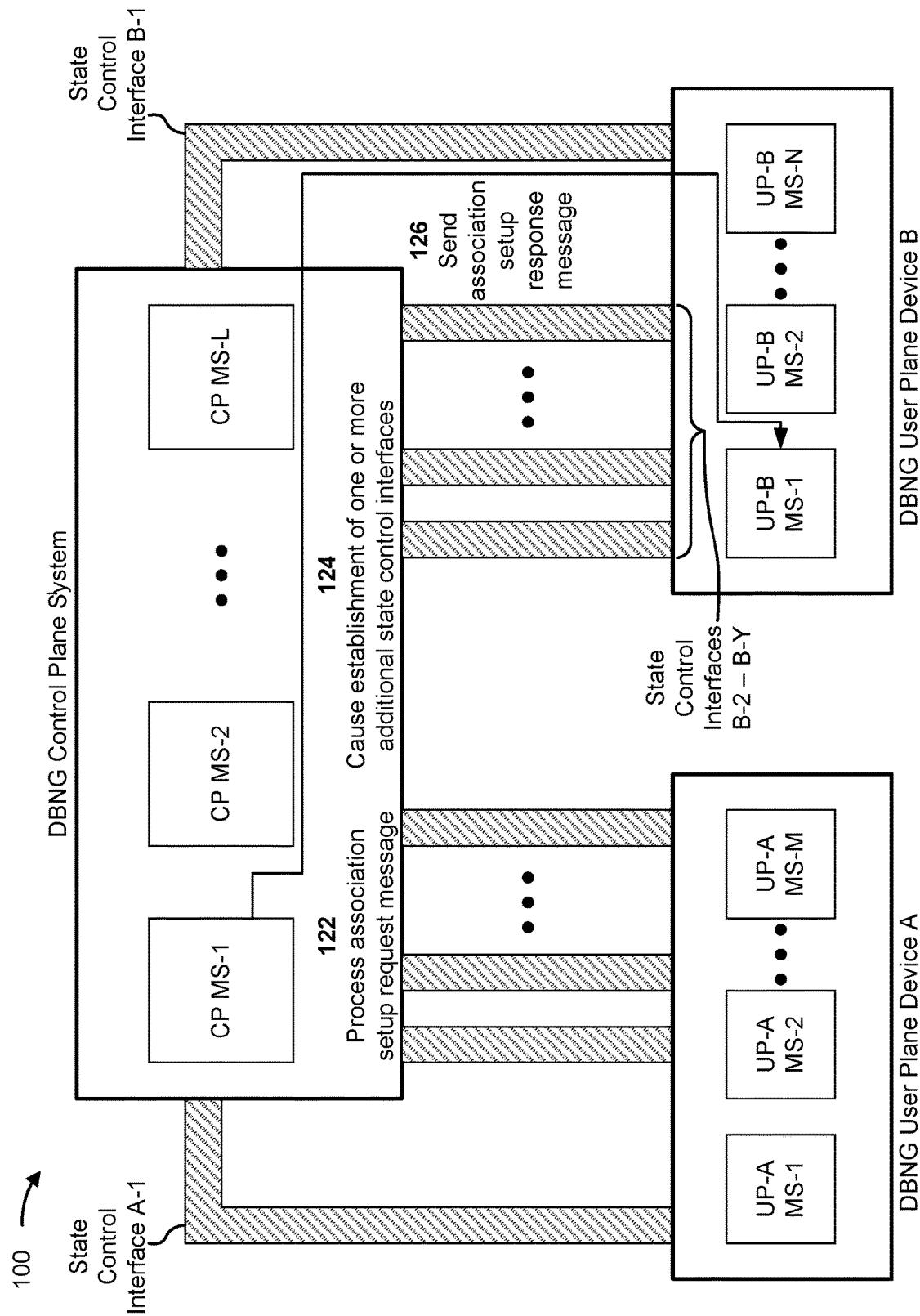

As shown in FIG. 1E, and by reference number 122, the DBNG control plane system may process the other association setup request message (e.g., after receiving the other association setup request message). For example, the DBNG control plane system may process (e.g., parse) the other association setup request message to determine the one or more capabilities of the DBNG user plane device B, such as the quantity of state control interfaces that the DBNG user plane device B can support. In some implementations, a microservice of the DBNG control plane system, such as the CP MS-1 microservice that received the other association setup request message, may process the other association setup request message to determine the one or more capabilities of the DBNG user plane device B.

As shown by reference number 124, the DBNG control plane system may cause one or more additional state control interfaces to be established between the DBNG control plane system and the DBNG user plane device B. For example, as further shown in FIG. 1E, the DBNG control plane system may cause one or more additional state control interfaces B-2 through B-Y, where Y≥2, to be established between the DBNG control plane system and the DBNG user plane device B. Hereinafter, the one or more additional state control interfaces A-2 through A-X between the DBNG control plane system and the DBNG user plane device A are referred to as the "first set of additional control interfaces," and the one or more additional state control interfaces B-2 through B-Y between the DBNG control plane system and the DBNG user plane device B are referred to as the "second set of additional state control interfaces."

In some implementations, the DBNG control plane system may cause the second set of additional state control interfaces to be established based on determining the one or more capabilities of the DBNG user plane device B. For example, the DBNG control plane system may cause, based on the quantity of state control interfaces that the DBNG user plane device B can support, one or more ports of the DBNG control plane system to be respectively allocated for the second set of additional state control interfaces. As shown by reference number 126, the DBNG control plane system may send (e.g., via the other state control interface) an association setup response message that includes identification information associated with the one or more ports (e.g., that indicates the port numbers of the one or more ports) to the DBNG user plane device B. The DBNG user plane device B may process (e.g., parse) the association setup response message to determine the identification information and may cause, based on the identification information, one or more ports of the DBNG user plane device B to be respectively allocated for the second set of additional state control interfaces (e.g., such that an additional state control interface is established between particular ports of the DBNG control plane system and the DBNG user plane device B).

In some implementations, a microservice of the DBNG control plane system, such as the CP MS-1 microservice, may cause establishment of the one or more additional state control interfaces (e.g., as described herein in relation to reference numbers 122 and 124). Additionally, or alternatively, a microservice of the DBNG user plane device B, such as the UP-B MS-1 microservice, may facilitate establishment of the second set of additional state control interfaces (e.g., as described herein in relation to reference number 126).

In this way, as described herein, the DBNG control plane system may cause a first set of additional state control interfaces to be established between the DBNG control plane system and DBNG user plane device A, and may cause a second set of additional state control interfaces to be established between the DBNG control plane system and the DBNG user plane device B. While some implementations described herein are directed to the DBNG control plane system causing respective sets of additional state control interface to be established between the DBNG control plane system and two different DBNG user plane devices, contemplated implementations include the DBNG control plane system causing respective sets of additional state control interface to be established between the DBNG control plane system and any quantity of DBNG user plane devices.

Figure 1F:
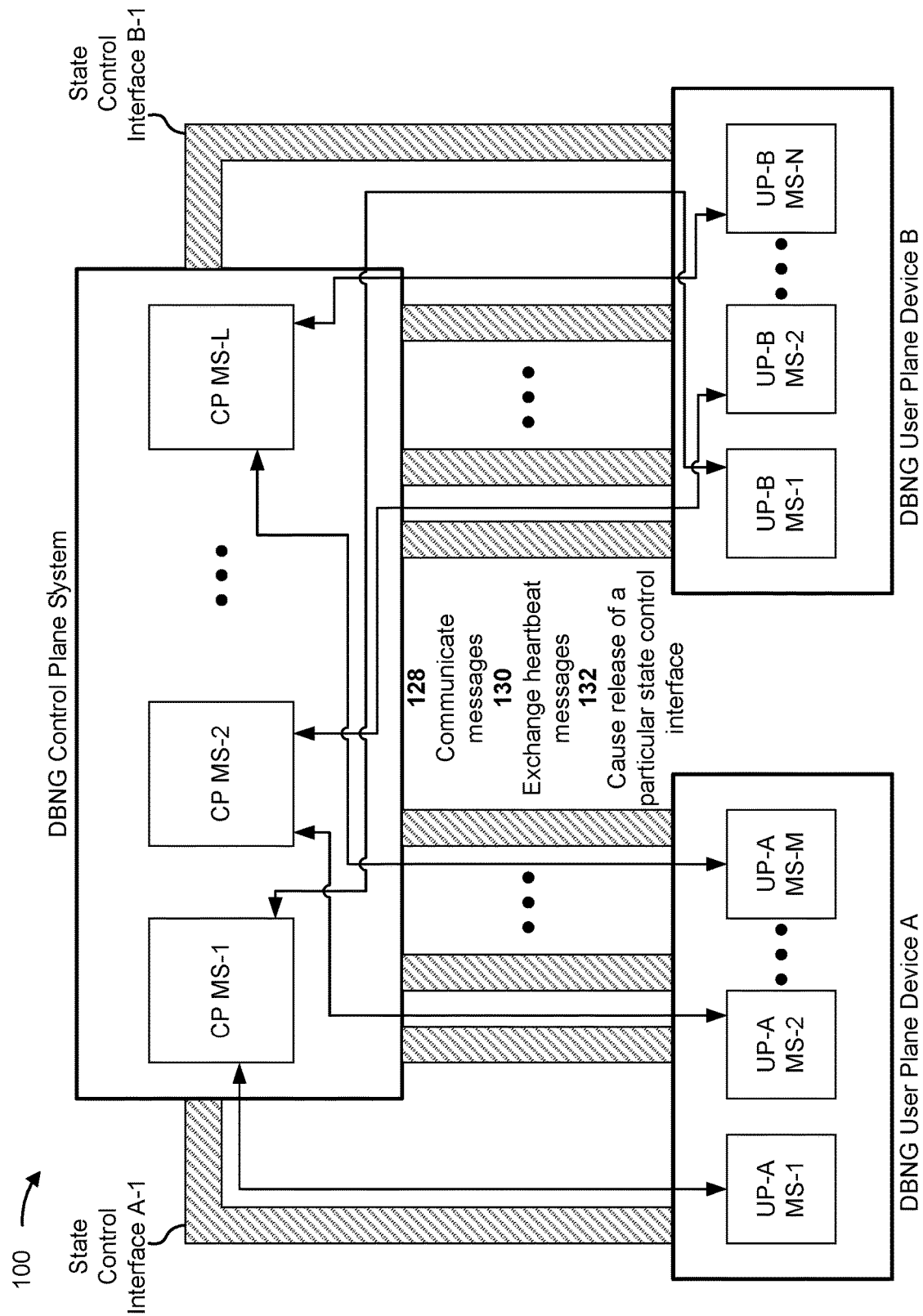

As shown in FIG. 1F, and by reference number 128, the DBNG control plane system and/or the DBNG user plane device B may communicate messages. For example, the DBNG control plane system may send messages to and/or receive messages from the DBNG user plane device B. In some implementations, the DBNG control plane system and/or the DBNG user plane device B may communicate messages via the other state control interface and the second set of additional state control interfaces between the DBNG control plane system and the DBNG user plane device B. For example, the DBNG control plane system and/or the DBNG user plane device B may communicate messages via the state control interface B-1 and the additional state control interfaces B-2 through B-Y.

In some implementations, each state control interface, of the other state control interface and the second set of additional state control interfaces, may transmit messages associated with a particular type of message. For example, the DBNG control plane system and/or the DBNG user plane device B may communicate a first set of messages associated with a first message type via the other state control interface, may communicate a second set of messages associated with a second message type via a first subset of additional state control interfaces of the second set of additional state control interfaces (e.g., a first subset that comprises at least some of the second set of additional state control interfaces), and/or may communicate a third set of messages associated with a third message type via a second subset of additional state control interfaces of the one or more additional state control interfaces (e.g., a second subset that comprises at least some of the second set of additional state control interfaces). In a specific example, the DBNG control plane system and/or the DBNG user plane device B may communicate node-related messages (e.g., PFCP messages with message type values of 3-15, as described herein in relation to FIG. 2) via the other state control interface, session-related messages (e.g., PFCP messages with message type values of 50-55, as described herein in relation to FIG. 2) via the first subset of additional state control interfaces, and reporting-related messages (e.g., PFCP messages with message type values of 56-57, as described herein in relation to FIG. 2) via the second subset of additional control interfaces.

In some implementations, each state control interface, of the other state control interface and the second set of additional state control interfaces, may be associated with a microservice of the DBNG control plane system and/or may be associated with a microservice of the DBNG user plane device B. For example, as shown in FIG. 1F, the state control interface B-1 may be associated with the CP MS-1 microservice of the DBNG control plane system and/or the UP-B MS-1 microservice of the DBNG user plane device B. That is, the CP MS-1 microservice of the DBNG control plane system and/or the UP-B MS-1 microservice of the DBNG user plane device B may communicate messages (e.g., messages of a first message type, such as node-related messages) via the state control interface B-1.

As another example, as shown in FIG. 1F, a first subset of additional state control interfaces of the second set of additional state control interfaces (e.g., a first subset that comprises at least some of the second set of additional state control interfaces) may be associated with the CP MS-2 microservice of the DBNG control plane system and/or the UP-B MS-2 microservice of the DBNG user plane device B and/or a second subset of additional state control interfaces of the second set of additional state control interfaces (e.g., a second subset that comprises at least some of the second set of additional state control interfaces) may be associated with the CP MS-L microservice of the DBNG control plane system and/or the UP-B MS-N microservice of the DBNG user plane device B. That is, the CP MS-2 microservice of the DBNG control plane system and/or the UP-B MS-2 microservice of the DBNG user plane device B may communicate messages (e.g., messages of a second message type, such as session-related messages) via the first subset of additional state control interfaces and/or the CP MS-L microservice of the DBNG control plane system, and/or the UP-B MS-N microservice of the DBNG user plane device B may communicate messages (e.g., messages of a third message type, such as reporting-related messages) via the second subset of additional state control interfaces.

As further shown in FIG. 1F, and by reference number 130, the DBNG control plane system and the DBNG user plane device B may exchange heartbeat messages via the other state control interface and the second set of additional state control interfaces. For example, the DBNG control plane system and/or the DBNG user plane device B may send heartbeat messages to and/or receive heartbeat messages from each other via the other state control interface and the second set of additional state control interfaces (e.g., send and/or receive respective heartbeat messages via the other state control interface and the second set of additional state control interfaces).

In this way, the DBNG control plane system and/or the DBNG user plane device B may determine (e.g., based on a frequency of the exchange of heartbeat messages) whether a particular state control interface, of the other state control interface and the second set of additional state control interfaces, is active or inactive (e.g., whether the particular state control interface is up or down). For example, the DBNG control plane system may determine that a heartbeat timeout interval has expired without the DBNG control plane system receiving at least one heartbeat message from the DBNG user plane device B via the particular state control interface (e.g., a time between receiving heartbeat messages from the DBNG user plane device B via the particular state control interface has exceeded the timeout interval). This may indicate that the particular state control interface is inactive. Accordingly, as shown by reference number 132, the DBNG control plane system may cause the particular state control interface to be released (e.g., cause the particular state control interface to be torn down). In this way, resources associated with maintaining the particular state control interface by the DBNG control plane system and/or the DBNG user plane device B may be reallocated to improve a performance of the DBNG control plane system and/or the DBNG user plane device B.

As indicated above, FIGS. 1A-1F are provided merely as one or more examples. Other examples may differ from what is described with regard to FIGS. 1A-1F. In practice, there may be additional devices and/or systems, fewer devices and/or systems, different devices and/or systems, or differently arranged devices and/or systems than those shown in FIGS. 1A-1F. Furthermore, two or more devices or systems shown in FIGS. 1A-1F may be implemented within a single device or system, or a single device or system shown in FIGS. 1A-1F may be implemented as multiple, distributed devices or systems. Additionally, or alternatively, a set of devices or systems (e.g., one or more devices or systems) of implementation 100 may perform one or more functions described as being performed by another set of devices or systems of implementation 100.

FIG. 2 is an illustration 200 of types of messages that may be communicated by a DBNG control plane system and a DBNG user plane device (e.g., via a state control interface and one or more additional state control interfaces between the DBNG control plane system and the DBNG user plane device), as described herein. As shown in FIG. 2, the messages may be PFCP messages. For example, the messages may include PFCP heartbeat messages (e.g., with message type values 1-2), PFCP node-related messages (e.g., with message type values 3-15), PFCP session-related messages (e.g., with message type values 50-55), and/or PFCP reporting-related messages (e.g., with message type values 56-57). In some implementations, PFCP messages of a particular message type may be communicated via a particular state control interface between the DBNG control plane system and the DBNG user plane device, as described herein.

As indicated above, FIG. 2 is provided merely as one or more examples. Other examples may differ from what is described with regard to FIG. 2.

Figure 3:
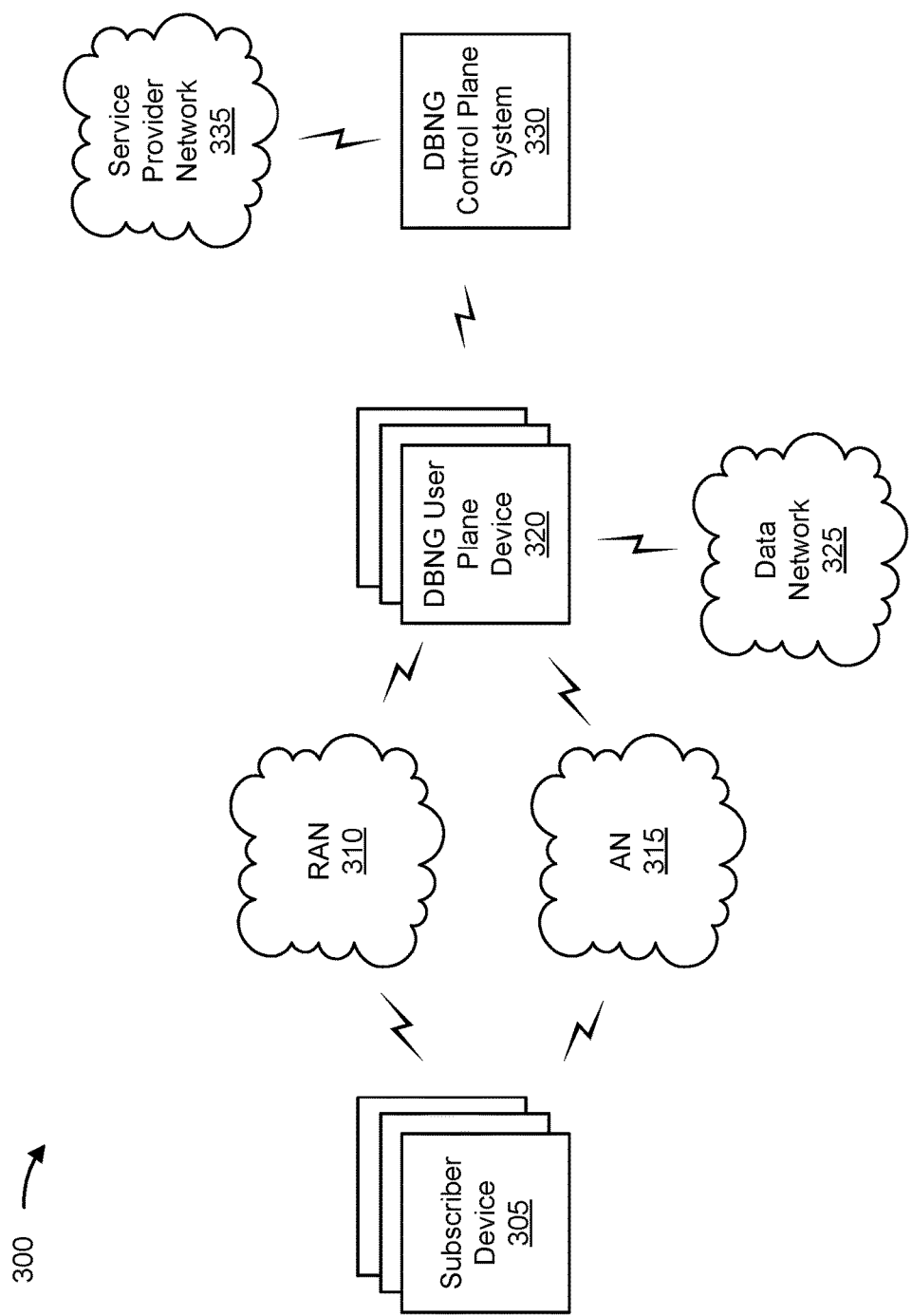
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include multiple subscriber devices 305, a radio access network (RAN) 310, an access network (AN) 315, multiple DBNG user plane devices 320, a data network, a DBNG control plane system 330, and a service provider network 335. Devices and/or networks of example environment 300 may interconnect via wired connections, wireless connections, or a combination of wired and wireless connections.

Subscriber device 305 includes one or more devices capable of receiving, generating, storing, processing, and/or providing information, such as information described herein. For example, subscriber device 305 may include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, or a similar type of device. In some implementations, subscriber device 305 may provide and/or receive network traffic to and/or from DBNG user plane device 320 via RAN 310 or AN 315.

RAN 310 may support, for example, a cellular radio access technology (RAT). RAN 310 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for subscriber device 305. RAN 310 may transfer traffic between subscriber device 305 (e.g., using a cellular RAT), one or more base stations (e.g., using a wireless interface or a backhaul interface, such as a wired backhaul interface), DBNG user plane device 320, and/or data network 325. RAN 310 may provide one or more cells that cover geographic areas.

AN 315 includes one or more wired and/or wireless networks. For example, AN 315 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. AN 315 may transfer traffic between subscriber device 305, DBNG user plane device 320, and/or data network 325.

DBNG user plane device 320 includes one or more devices capable of receiving, processing, storing, routing, and/or providing traffic (e.g., a packet and/or other information or metadata) in a manner described herein. For example, DBNG user plane device 320 may include a router, such as a label switching router (LSR), a label edge router (LER), an ingress router, an egress router, a provider router (e.g., a provider edge router or a provider core router), a virtual router, or another type of router. Additionally, or alternatively, DBNG user plane device 320 may include a gateway, a switch, a firewall, a hub, a bridge, a reverse proxy, a server (e.g., a proxy server, a cloud server, or a data center server), a load balancer, and/or a similar device. In some implementations, DBNG user plane device 320 may be a physical device implemented within a housing, such as a chassis. In some implementations, DBNG user plane device 320 may be a virtual device implemented by one or more computing devices of a cloud computing environment or a data center. In some implementations, a group of DBNG user plane devices 320 may be a group of data center nodes that are used to route traffic flow through a network. DBNG user plane device 320 may transfer traffic between subscriber device 305 and/or data network 325. DBNG user plane device 320 may perform control plane functionality for a DBNG. In some implementations, DBNG user plane device 320 may communicate with the DBNG control plane system 330 via multiple state control interfaces, as described herein.

Data network 325 includes one or more wired and/or wireless data networks. For example, data network 325 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

DBNG control plane system 330 includes one or more devices capable of receiving, generating, storing, processing, providing, and/or routing information, as described elsewhere herein. DBNG control plane system 330 may include a communication device and/or a computing device. For example, the DBNG control plane system 330 may include a server, such as an application server, a client server, a host server, a proxy server, a virtual server (e.g., executing on computing hardware), or a server in a cloud computing system. In some implementations, DBNG control plane system 330 includes computing hardware used in a cloud computing environment. DBNG control plane system 330 may perform control plane functionality for a DBNG. Control plane functionality includes multiple control plane functions, such as subscriber session termination, performing signaling protocols such as Point-to-Point Protocol over Ethernet (PPPoE), IP over Ethernet (IPoE), IP address assignment and management, authentication/authorization/accounting (AAA), policy enforcement, gateway operations, lawful intercept, local management, keep-alive message processing, and configuring DBNG user plane device 320. In some implementations, DBNG control plane system 330 may communicate with DBNG user plane device 320 via multiple state control interfaces, as described herein.

Service provider network 335 includes one or more wired and/or wireless networks (e.g., that are associated with a service provider, such as an Internet service provider (ISP)). For example, the service provider network 335 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
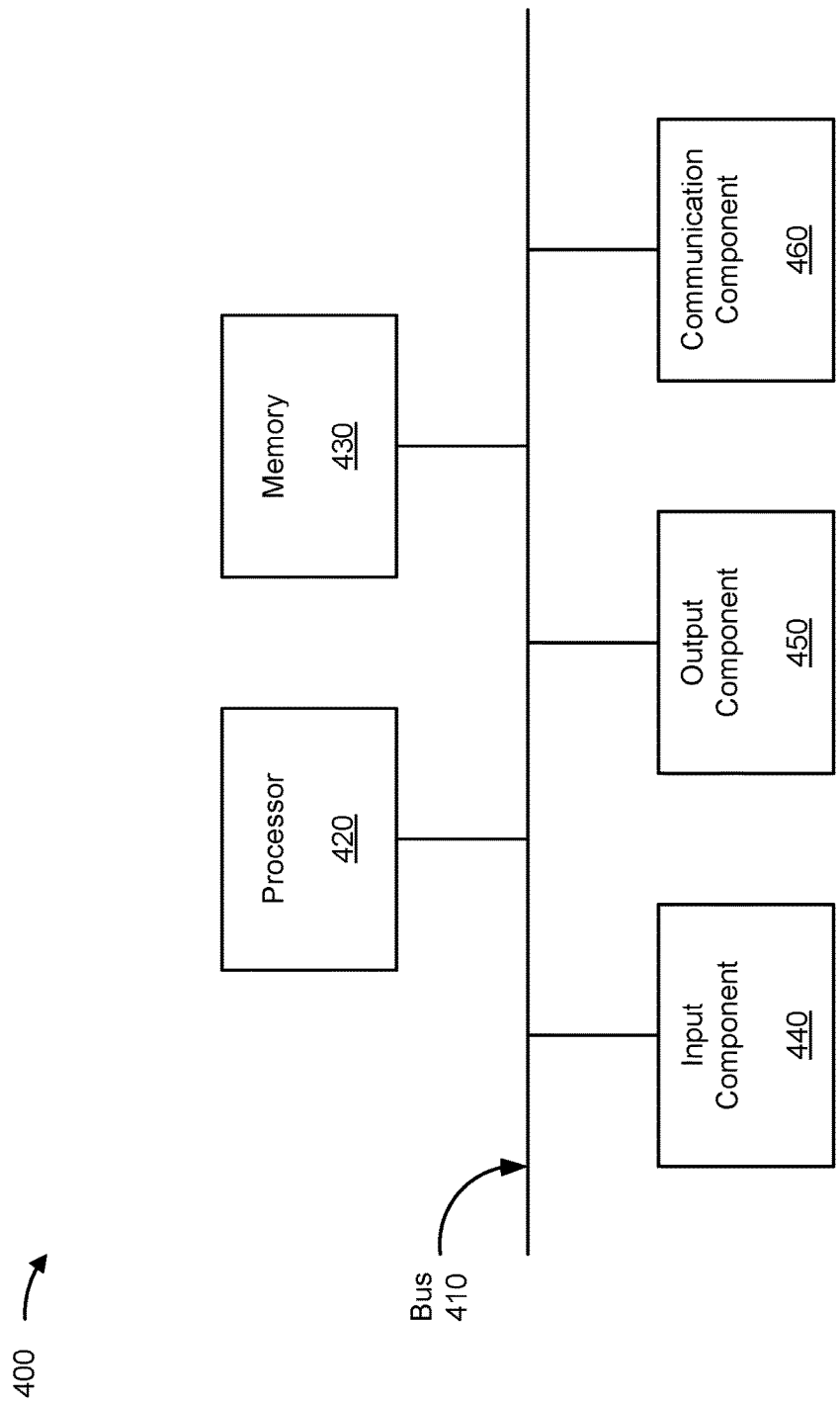
FIGS. 4-5 are diagrams of example components of one or more devices of FIG. 3.

FIG. 4 is a diagram of example components of a device 400, which may correspond to subscriber device 305, DBNG user plane device 320, and/or DBNG control plane system 330. In some implementations, subscriber device 305, DBNG user plane device 320, and/or DBNG control plane system 330 may include one or more devices 400 and/or one or more components of device 400. As shown in FIG. 4, device 400 may include a bus 410, a processor 420, a memory 430, an input component 440, an output component 450, and a communication component 460.

Bus 410 includes one or more components that enable wired and/or wireless communication among the components of device 400. Bus 410 may couple together two or more components of FIG. 4, such as via operative coupling, communicative coupling, electronic coupling, and/or electric coupling. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform one or more operations or processes described elsewhere herein.

Memory 430 includes volatile and/or nonvolatile memory. For example, memory 430 may include random access memory (RAM), read only memory (ROM), a hard disk drive, and/or another type of memory (e.g., a flash memory, a magnetic memory, and/or an optical memory). Memory 430 may include internal memory (e.g., RAM, ROM, or a hard disk drive) and/or removable memory (e.g., removable via a universal serial bus connection). Memory 430 may be a non-transitory computer-readable medium. Memory 430 stores information, instructions, and/or software (e.g., one or more software applications) related to the operation of device 400. In some implementations, memory 430 includes one or more memories that are coupled to one or more processors (e.g., processor 420), such as via bus 410.

Input component 440 enables device 400 to receive input, such as user input and/or sensed input. For example, input component 440 may include a touch screen, a keyboard, a keypad, a mouse, a button, a microphone, a switch, a sensor, a global positioning system sensor, an accelerometer, a gyroscope, and/or an actuator. Output component 450 enables device 400 to provide output, such as via a display, a speaker, and/or a light-emitting diode. Communication component 460 enables device 400 to communicate with other devices via a wired connection and/or a wireless connection. For example, communication component 460 may include a receiver, a transmitter, a transceiver, a modem, a network interface card, and/or an antenna.

Device 400 may perform one or more operations or processes described herein. For example, a non-transitory computer-readable medium (e.g., memory 430) may store a set of instructions (e.g., one or more instructions or code) for execution by processor 420. Processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, processor 420 may be configured to perform one or more operations or processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
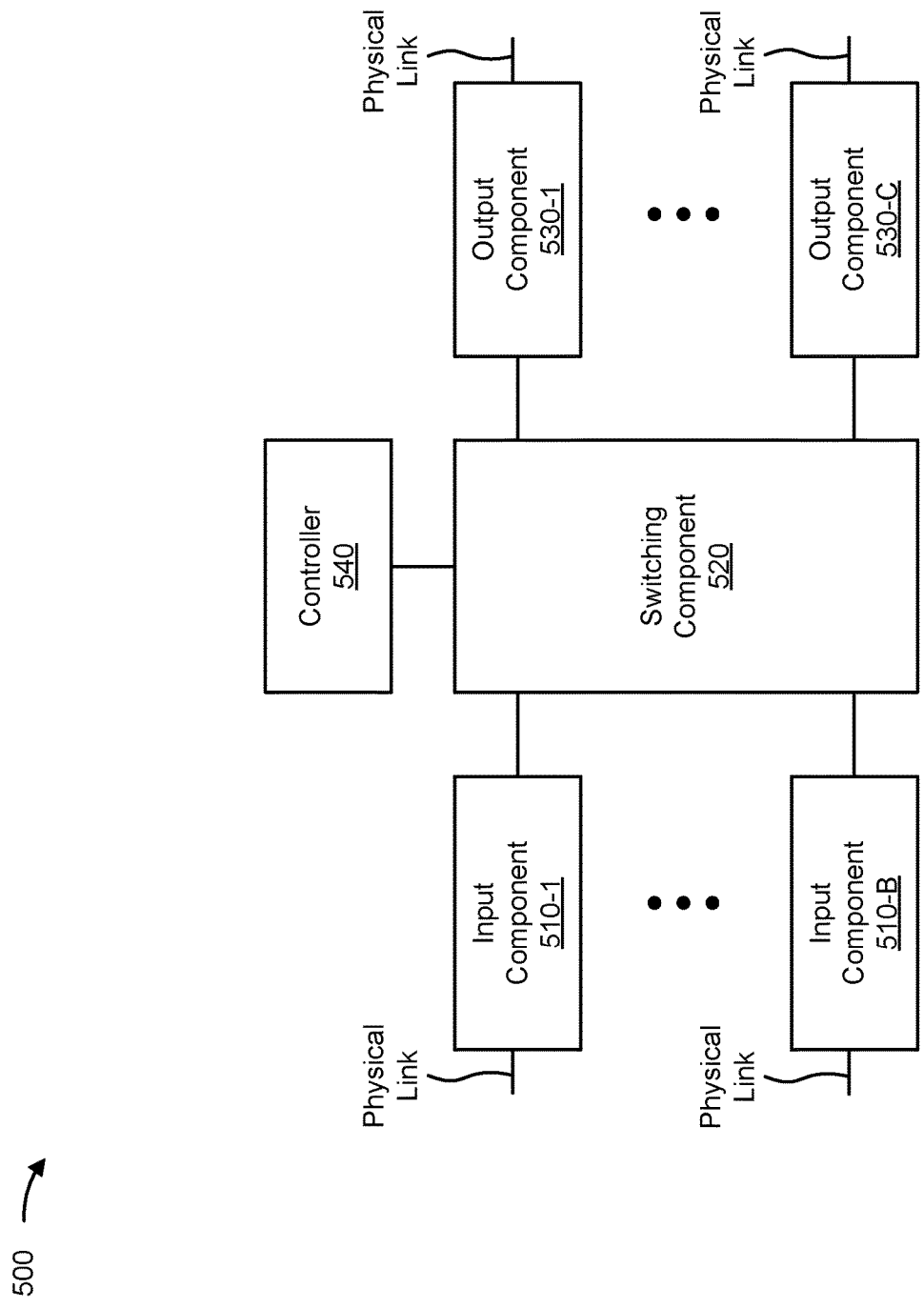

FIG. 5 is a diagram of example components of a device 500. Device 500 may correspond to subscriber device 305, DBNG user plane device 320, and/or DBNG control plane system 330. In some implementations, subscriber device 305, DBNG user plane device 320, and/or DBNG control plane system 330 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
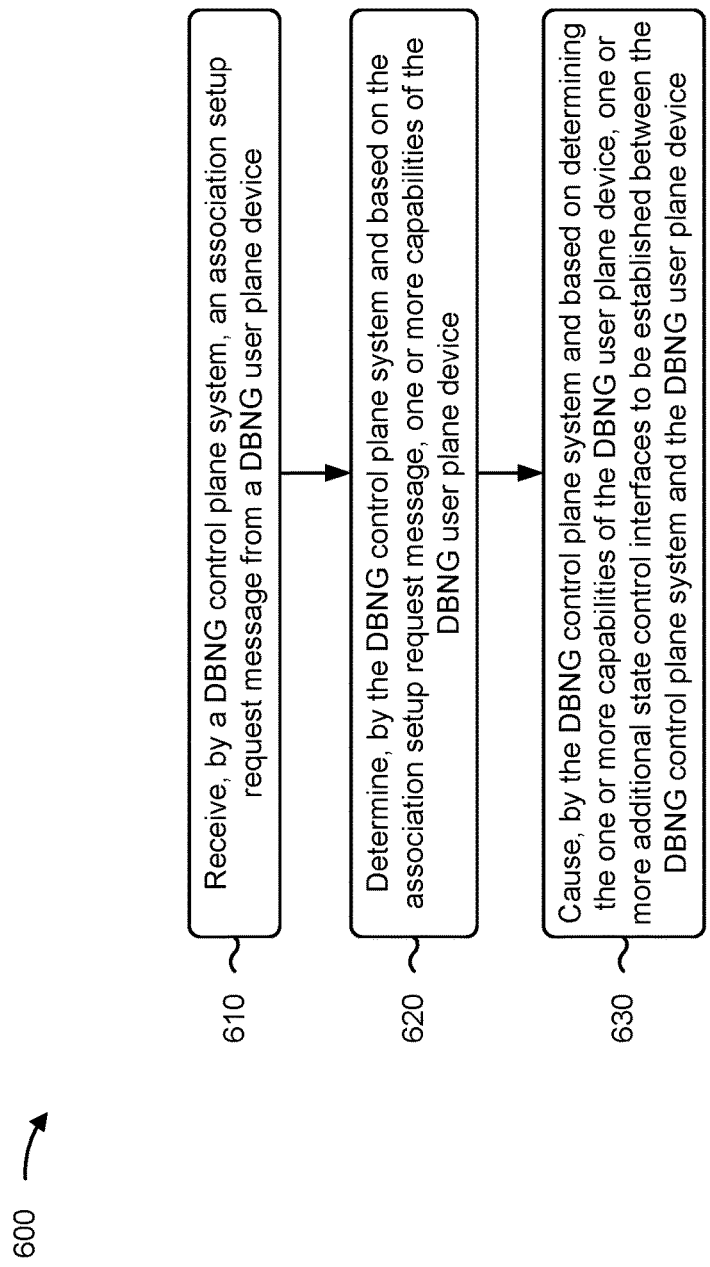

FIG. 6 is a flowchart of an example process 600 associated with establishing multiple state control interfaces between a DBNG control plane system and DBNG user plane device. In some implementations, one or more process blocks of FIG. 6 may be performed by a DBNG control plane system (e.g., DBNG control plane system 330). In some implementations, one or more process blocks of FIG. 6 may be performed by another device or a group of devices separate from or including the DBNG control plane system, such as a DBNG user plane device (e.g., DBNG user plane device 320). Additionally, or alternatively, one or more process blocks of FIG. 6 may be performed by one or more components of device 400, such as processor 420, memory 430, input component 440, output component 450, and/or communication component 460; one or more components of device 500, such as input component 510, switching component 520, output component 530, and/or controller 540; and/or one or more components of another device.

As shown in FIG. 6, process 600 may include receiving an association setup request message from a DBNG user plane device (block 610). For example, the DBNG control plane system may receive an association setup request message from a DBNG user plane device, as described above. In some implementations, the association setup request message is received via a state control interface between the DBNG control plane system and the DBNG user plane device.

As further shown in FIG. 6, process 600 may include determining, based on the association setup request message, one or more capabilities of the DBNG user plane device (block 620). For example, the DBNG control plane system may determine, based on the association setup request message, one or more capabilities of the DBNG user plane device, as described above.

As further shown in FIG. 6, process 600 may include causing, based on determining the one or more capabilities of the DBNG user plane device, one or more additional state control interfaces to be established between the DBNG control plane system and the DBNG user plane device (block 630). For example, the DBNG control plane system may cause, based on determining the one or more capabilities of the DBNG user plane device, one or more additional state control interfaces to be established between the DBNG control plane system and the DBNG user plane device, as described above.

Process 600 may include additional implementations, such as any single implementation or any combination of implementations described below and/or in connection with one or more other processes described elsewhere herein.

In a first implementation, process 600 includes communicating a first set of messages associated with a first message type via the state control interface, and communicating a second set of messages associated with a second message type via at least one of the one or more additional state control interfaces.

In a second implementation, alone or in combination with the first implementation, the one or more additional state control interfaces comprise a first set of additional state control interfaces and a second set of additional state control interfaces, and process 600 comprises communicating node-related messages via the state control interface, communicating session-related messages via the first set of additional state control interfaces, and communicating reporting-related messages via the second set of additional state control interfaces.

In a third implementation, alone or in combination with one or more of the first and second implementations, process 600 includes sending respective heartbeat messages to the DBNG user plane device via the state control interface and the one or more additional state control interfaces.

In a fourth implementation, alone or in combination with one or more of the first through third implementations, process 600 includes determining that a heartbeat timeout interval has expired without the DBNG control plane system receiving at least one heartbeat message from the DBNG user plane device via a particular state control interface of the state control interface and the one or more additional state control interfaces, and causing, based on determining that the heartbeat timeout interval has expired, the particular state control interface to be released.

In a fifth implementation, alone or in combination with one or more of the first through fourth implementations, each state control interface, of the state control interface and the one or more additional state control interfaces, is associated with a microservice of one or more microservices of the DBNG control plane system.

In a sixth implementation, alone or in combination with one or more of the first through fifth implementations, the one or more capabilities indicate a quantity of state control interfaces that the DBNG user plane device can support.

In a seventh implementation, alone or in combination with one or more of the first through sixth implementations, causing the one or more additional state control interfaces to be established comprises determining, based on the one or more capabilities of the DBNG user plane device, a quantity of state control interfaces that the DBNG user plane device can support; causing, based on the quantity of state control interfaces that the DBNG user plane device can support, one or more ports of the DBNG control plane system to be respectively allocated for the one or more additional state control interfaces; and sending, via the state control interface, an association setup response message that includes identification information associated with the one or more ports.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
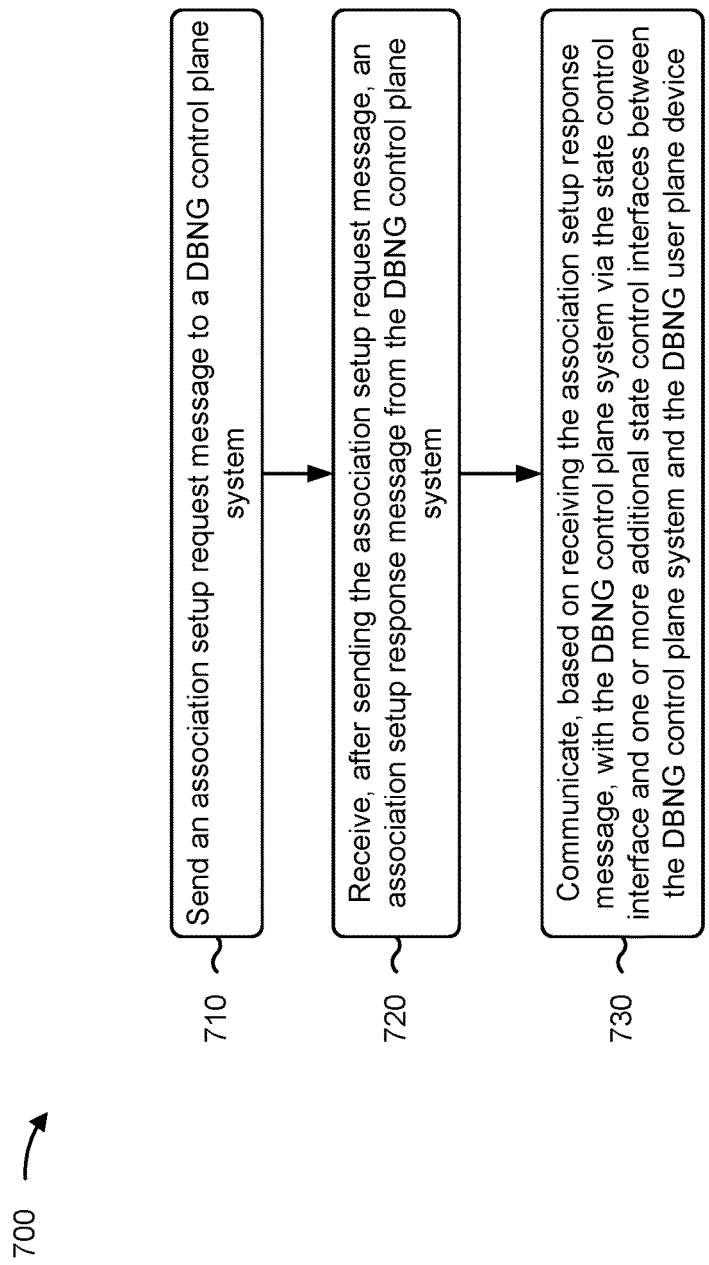

FIG. 7 is a flowchart of an example process 700 associated with establishing multiple state control interfaces between a DBNG control plane system and DBNG user plane device. In some implementations, one or more process blocks of FIG. 7 may be performed by an DBNG user plane device (e.g., DBNG user plane device 320). In some implementations, one or more process blocks of FIG. 7 may be performed by another device or a group of devices separate from or including the DBNG user plane device, such as a DBNG control plane system (e.g., DBNG control plane system 330). Additionally, or alternatively, one or more process blocks of FIG. 7 may be performed by one or more components of device 400, such as processor 420, memory 430, input component 440, output component 450, and/or communication component 460; one or more components of device 500, such as input component 510, switching component 520, output component 530, and/or controller 540; and/or one or more components of another device.

As shown in FIG. 7, process 700 may include sending an association setup request message to a DBNG control plane system (block 710). For example, the DBNG user plane device may send an association setup request message to a DBNG control plane system, as described above. In some implementations, the association setup request message is sent via a state control interface between the DBNG control plane system and the DBNG user plane device.

As further shown in FIG. 7, process 700 may include receiving, after sending the association setup request message, an association setup response message from the DBNG control plane system (block 720). For example, the DBNG user plane device may receive, after sending the association setup request message, an association setup response message from the DBNG control plane system, as described above.

As further shown in FIG. 7, process 700 may include communicating, based on receiving the association setup response message, with the DBNG control plane system via the state control interface and one or more additional state control interfaces between the DBNG control plane system and the DBNG user plane device (block 730). For example, the DBNG user plane device may communicate, based on receiving the association setup response message, with the DBNG control plane system via the state control interface and one or more additional state control interfaces between the DBNG control plane system and the DBNG user plane device, as described above. In some implementations, the one or more additional state control interfaces are established based on the DBNG user plane device sending the association setup request message to the DBNG control plane system.

Process 700 may include additional implementations, such as any single implementation or any combination of implementations described below and/or in connection with one or more other processes described elsewhere herein.

In a first implementation, process 700 includes communicating a first set of messages associated with a first message type via the state control interface, and communicating a second set of messages associated with a second message type via at least one of the one or more additional state control interfaces.

In a second implementation, alone or in combination with the first implementation, the one or more additional state control interfaces comprise a first set of additional state control interfaces and a second set of additional state control interfaces, wherein process 700 includes communicating node-related messages via the state control interface, communicating session-related messages via the first set of additional state control interfaces, and communicating reporting-related messages via the second set of additional state control interfaces.

In a third implementation, alone or in combination with one or more of the first and second implementations, process 700 includes sending respective heartbeat messages to the DBNG control plane system via the state control interface and the one or more additional state control interfaces.

In a fourth implementation, alone or in combination with one or more of the first through third implementations, each state control interface, of the state control interface and the one or more additional state control interfaces, is associated with a microservice of one or more microservices of the DBNG user plane device.

In a fifth implementation, alone or in combination with one or more of the first through fourth implementations, the association setup request message indicates a quantity of state control interfaces that the DBNG user plane device can support.

In a sixth implementation, alone or in combination with one or more of the first through fifth implementations, process 700 includes determining, prior to communicating with the DBNG control plane system and based on the association setup response message, identification information associated with one or more ports of the DBNG control plane system that are respectively associated with the one or more additional state control interfaces; and causing, based on the identification information, one or more ports of the DBNG user plane device to be respectively allocated for the one or more additional state control interfaces.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIG. 8 is a flowchart of an example process 800 associated with establishing multiple state control interfaces between a DBNG control plane system and DBNG user plane device. In some implementations, one or more process blocks of FIG. 8 may be performed by an DBNG control plane system (e.g., DBNG control plane system 330). In some implementations, one or more process blocks of FIG. 8 may be performed by another device or a group of devices separate from or including the DBNG control plane system, such as a DBNG user plane device (e.g., DBNG user plane device 320). Additionally, or alternatively, one or more process blocks of FIG. 8 may be performed by one or more components of device 400, such as processor 420, memory 430, input component 440, output component 450, and/or communication component 460; one or more components of device 500, such as input component 510, switching component 520, output component 530, and/or controller 540; and/or one or more components of another device.

As shown in FIG. 8, process 800 may include receiving, via a state control interface between the DBNG control plane system and a DBNG user plane device, an association setup request message from the DBNG user plane device (block 810). For example, the DBNG control plane system may receive, via a state control interface between the DBNG control plane system and a DBNG user plane device, an association setup request message from the DBNG user plane device, as described above.

As further shown in FIG. 8, process 800 may include causing, based on the association setup request message, a set of additional state control interfaces to be established between the DBNG control plane system and the DBNG user plane device (block 820). For example, the DBNG control plane system may cause, based on the association setup request message, a set of additional state control interfaces to be established between the DBNG control plane system and the DBNG user plane device, as described above.

Process 800 may include additional implementations, such as any single implementation or any combination of implementations described below and/or in connection with one or more other processes described elsewhere herein.

In a first implementation, process 800 includes communicating a first set of messages associated with a first message type via the state control interface, and communicating a second set of messages associated with a second message type via at least some of the set of additional state control interfaces.

In a second implementation, alone or in combination with the first implementation, process 800 includes receiving, via another state control interface between the DBNG control plane system and another DBNG user plane device, another association setup request message from the other DBNG user plane device; and causing, based on the other association setup request message, another set of additional state control interfaces to be established between the DBNG control plane system and the other DBNG user plane device.

In a third implementation, alone or in combination with one or more of the first and second implementations, process 800 includes communicating a first set of messages associated with a first message type via the state control interface, communicating a second set of messages associated with a second message type via at least some of the set of additional state control interfaces, communicating a third set of messages associated with the first message type via the other state control interface, and communicating a fourth set of messages associated with the second message type via at least some of the other set of additional state control interfaces.

In a fourth implementation, alone or in combination with one or more of the first through third implementations, each of the state control interface and the other state control interface is associated with a first microservice of the DBNG control plane system, and at least some of the set of additional state control interfaces and at least some of the other set of additional state control interfaces are associated with a second microservice of the DBNG control plane system.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a disaggregated broadband network gateway (DBNG) control plane system, an association setup request message from a DBNG user plane device,
wherein the association setup request message is received via a state control interface between the DBNG control plane system and the DBNG user plane device;
determining, by the DBNG control plane system and based on the association setup request message, one or more capabilities of the DBNG user plane device; and
causing, by the DBNG control plane system and based on determining the one or more capabilities of the DBNG user plane device, one or more additional state control interfaces to be established between the DBNG control plane system and the DBNG user plane device.

2. The method of claim 1, further comprising:
communicating a first set of messages associated with a first message type via the state control interface; and
communicating a second set of messages associated with a second message type via at least one of the one or more additional state control interfaces.

3. The method of claim 1, wherein the one or more additional state control interfaces comprise a first set of additional state control interfaces and a second set of additional state control interfaces, and
wherein the method further comprises:
communicating node-related messages via the state control interface;
communicating session-related messages via the first set of additional state control interfaces; and
communicating reporting-related messages via the second set of additional state control interfaces.

4. The method of claim 1, further comprising:
sending respective heartbeat messages to the DBNG user plane device via the state control interface and the one or more additional state control interfaces.

5. The method of claim 1, further comprising:
determining that a heartbeat timeout interval has expired without the DBNG control plane system receiving at least one heartbeat message from the DBNG user plane device via a particular state control interface of the state control interface and the one or more additional state control interfaces; and
causing, based on determining that the heartbeat timeout interval has expired, the particular state control interface to be released.

6. The method of claim 1, wherein each state control interface, of the state control interface and the one or more additional state control interfaces, is associated with a microservice of one or more microservices of the DBNG control plane system.

7. The method of claim 1, wherein the one or more capabilities indicate a quantity of state control interfaces that the DBNG user plane device can support.

8. The method of claim 1, wherein causing the one or more additional state control interfaces to be established comprises:
determining, based on the one or more capabilities of the DBNG user plane device, a quantity of state control interfaces that the DBNG user plane device can support;
causing, based on the quantity of state control interfaces that the DBNG user plane device can support, one or more ports of the DBNG control plane system to be respectively allocated for the one or more additional state control interfaces; and
sending, via the state control interface, an association setup response message that includes identification information associated with the one or more ports.

9. A disaggregated broadband network gateway (DBNG) user plane device, comprising:
one or more memories; and
one or more processors to:
send an association setup request message to a DBNG control plane system,
wherein the association setup request message is sent via a state control interface between the DBNG control plane system and the DBNG user plane device;
receive, after sending the association setup request message, an association setup response message from the DBNG control plane system; and
communicate, based on receiving the association setup response message, with the DBNG control plane system via the state control interface and one or more additional state control interfaces between the DBNG control plane system and the DBNG user plane device,
wherein the one or more additional state control interfaces are established based on the DBNG user plane device sending the association setup request message to the DBNG control plane system.

10. The DBNG user plane device of claim 9, wherein the one or more processors are further to:
communicate a first set of messages associated with a first message type via the state control interface; and
communicate a second set of messages associated with a second message type via at least one of the one or more additional state control interfaces.

11. The DBNG user plane device of claim 9, wherein the one or more additional state control interfaces comprise a first set of additional state control interfaces and a second set of additional state control interfaces,
wherein the one or more processors are further to:
communicate node-related messages via the state control interface;
communicate session-related messages via the first set of additional state control interfaces; and
communicate reporting-related messages via the second set of additional state control interfaces.

12. The DBNG user plane device of claim 9, wherein the one or more processors are further to:
send respective heartbeat messages to the DBNG control plane system via the state control interface and the one or more additional state control interfaces.

13. The DBNG user plane device of claim 9, wherein each state control interface, of the state control interface and the one or more additional state control interfaces, is associated with a microservice of one or more microservices of the DBNG user plane device.

14. The DBNG user plane device of claim 9, wherein the association setup request message indicates a quantity of state control interfaces that the DBNG user plane device can support.

15. The DBNG user plane device of claim 9, wherein the one or more processors are further to:
   determine, prior to communicating with the DBNG control plane system and based on the association setup response message, identification information associated with one or more ports of the DBNG control plane system that are respectively associated with the one or more additional state control interfaces; and
   cause, based on the identification information, one or more ports of the DBNG user plane device to be respectively allocated for the one or more additional state control interfaces.

16. A non-transitory computer-readable medium storing a set of instructions, the set of instructions comprising:
   one or more instructions that, when executed by one or more processors of a disaggregated broadband network gateway (DBNG) control plane system, cause the DBNG control plane system to:
      receive, via a state control interface between the DBNG control plane system and a DBNG user plane device, an association setup request message from the DBNG user plane device; and
      cause, based on the association setup request message, a set of additional state control interfaces to be established between the DBNG control plane system and the DBNG user plane device.

17. The non-transitory computer-readable medium of claim 16, wherein the one or more instructions further cause the DBNG control plane system to:
   communicate a first set of messages associated with a first message type via the state control interface; and
   communicate a second set of messages associated with a second message type via at least some of the set of additional state control interfaces.

18. The non-transitory computer-readable medium of claim 16, wherein the one or more instructions further cause the DBNG control plane system to:
   receive, via another state control interface between the DBNG control plane system and another DBNG user plane device, another association setup request message from the other DBNG user plane device; and
   cause, based on the other association setup request message, another set of additional state control interfaces to be established between the DBNG control plane system and the other DBNG user plane device.

19. The non-transitory computer-readable medium of claim 18, wherein the one or more instructions further cause the DBNG control plane system to:
   communicate a first set of messages associated with a first message type via the state control interface;
   communicate a second set of messages associated with a second message type via at least some of the set of additional state control interfaces;
   communicate a third set of messages associated with the first message type via the other state control interface; and
   communicate a fourth set of messages associated with the second message type via at least some of the other set of additional state control interfaces.

20. The non-transitory computer-readable medium of claim 18, wherein:
   each of the state control interface and the other state control interface is associated with a first microservice of the DBNG control plane system; and
   at least some of the set of additional state control interfaces and at least some of the other set of additional state control interfaces are associated with a second microservice of the DBNG control plane system.

* * * * *